US012770548B2

(12) United States Patent
Sinha et al.

(10) Patent No.: US 12,770,548 B2
(45) Date of Patent: *Oct. 20, 2026

(54) DYNAMIC SLEEP FOR A DISPLAY PANEL

(71) Applicant: Tahoe Research, Ltd., Dublin (IE)

(72) Inventors: Vishal Sinha, Portland, OR (US); Paul Diefenbaugh, Portland, OR (US); Todd Witter, Orangevale, CA (US); Jason Tanner, Folsom, CA (US); Arthur Runyan, Folsom, CA (US); Nausheen Ansari, Folsom, CA (US); Kathy Bui, Hillsboro, OR (US); Yifan Li, Beaverton, OR (US)

(73) Assignee: Tahoe Research, Ltd., Dublin (IE)

( * ) Notice: Subject to any disclaimer, the term of this patent is extended or adjusted under 35 U.S.C. 154(b) by 81 days.

This patent is subject to a terminal disclaimer.

(21) Appl. No.: 18/893,015

(22) Filed: Sep. 23, 2024

(65) Prior Publication Data

US 2025/0022403 A1 Jan. 16, 2025

Related U.S. Application Data

(63) Continuation of application No. 16/866,520, filed on May 4, 2020, now Pat. No. 12,100,336, which is a
(Continued)

(51) Int. Cl.
*G09G 3/20* (2006.01)
*G06F 1/3206* (2019.01)
(Continued)

(52) U.S. Cl.
CPC ............. *G09G 3/22* (2013.01); *G06F 1/3206* (2013.01); *G06F 1/3237* (2013.01);
(Continued)

(58) Field of Classification Search
CPC ....... G09G 2310/04; G09G 2340/0435; G09G 3/20; G09G 5/006; G09G 2360/12;
(Continued)

(56) References Cited

U.S. PATENT DOCUMENTS 9,052,902 B2 6/2015 Hayek et al.
9,158,672 B1 10/2015 Zheng et al.
(Continued)

OTHER PUBLICATIONS

United States Patent and Trademark Office, "Notice of Allowance," mailed in connection with U.S. Appl. No. 16/024,587, on Jan. 2, 2020, 10 pages.

*Primary Examiner* — Dismery Mercedes
(74) *Attorney, Agent, or Firm* — Studebaker Brackett PLLC

(57) ABSTRACT

Technology for a display controller is described. The display controller can detect a frame update when the display controller is in a dynamic sleep state. The display controller can wake up from the dynamic sleep state and enter a selective update state at a programmed vertical blanking interrupt (VBI) that precedes an actual VBI. The display controller can perform a scan-out with a display panel during the selective update state. The display controller can return to the dynamic sleep state in a same time frame after the scan-out is completed. The display controller can exclude timing logic to send a VBI at every time frame to the display panel to maintain time synchronization between the display controller and the display panel.

17 Claims, 13 Drawing Sheets

Related U.S. Application Data continuation of application No. 16/024,587, filed on Jun. 29, 2018, now Pat. No. 10,643,525.

(51) Int. Cl.

| | |
|---|---|
| ***G06F 1/3234*** | (2019.01) |
| ***G06F 1/3237*** | (2019.01) |
| ***G06F 3/041*** | (2006.01) |
| ***G09G 3/22*** | (2006.01) |
| ***G09G 3/36*** | (2006.01) |
| ***G09G 5/00*** | (2006.01) |

(52) U.S. Cl.

CPC ............ *G06F 1/3243* (2013.01); *G06F 1/325* (2013.01); *G06F 1/3265* (2013.01); *G06F 1/3278* (2013.01); *G06F 3/0416* (2013.01); *G09G 3/20* (2013.01); *G09G 3/3618* (2013.01); *G09G 5/006* (2013.01); *G09G 2310/0213* (2013.01); *G09G 2310/04* (2013.01); *G09G 2310/08* (2013.01); *G09G 2330/022* (2013.01); *G09G 2360/12* (2013.01); *G09G 2360/18* (2013.01)

(58) Field of Classification Search

CPC ..... G09G 2320/0686; G09G 2360/127; G09G 2360/18; G09G 5/393; G09G 2310/08; G09G 3/2092; G09G 5/18; G09G 2354/00; G06F 1/325

See application file for complete search history.

(56) References Cited

U.S. PATENT DOCUMENTS

| | | | | |
|---|---|---|---|---|
| 9,269,121 | B2 | 2/2016 | Jeganathan et al. | |
| 9,383,851 | B2 | 7/2016 | Wyatt | |
| 9,984,647 | B2 | 5/2018 | Colenbrander | |
| 10,049,642 | B2 | 8/2018 | Ansari | |
| 10,074,203 | B2 * | 9/2018 | Morein | G06T 11/60 |
| 10,643,525 | B2 | 5/2020 | Sinha et al. | |
| 2011/0242116 | A1 | 10/2011 | Nath et al. | |
| 2012/0254645 | A1 | 10/2012 | Jeganathan et al. | |
| 2013/0147822 | A1 * | 6/2013 | Yu | G09G 5/393 345/547 |
| 2014/0002739 | A1 * | 1/2014 | Kwa | H04N 5/04 348/536 |
| 2014/0184611 | A1 * | 7/2014 | Wyatt | G09G 3/36 345/501 |
| 2014/0218378 | A1 | 8/2014 | Roh et al. | |
| 2016/0042720 | A1 * | 2/2016 | Chiang | G09G 5/18 345/212 |
| 2016/0343320 | A1 * | 11/2016 | Tann | G09G 3/3618 |
| 2017/0109859 | A1 * | 4/2017 | Singh | G09G 3/20 |
| 2017/0295343 | A1 | 10/2017 | Konishi et al. | |
| 2018/0308439 | A1 | 10/2018 | Cheng et al. | |
| 2019/0043406 | A1 * | 2/2019 | Ansari | G09G 3/20 |
| 2019/0043458 | A1 * | 2/2019 | Kwa | G09G 5/006 |
| 2019/0251915 | A1 * | 8/2019 | Fukuchi | G09G 3/36 |

* cited by examiner

DYNAMIC SLEEP FOR A DISPLAY PANEL

PRIORITY DATA

This application is a continuation of U.S. patent application Ser. No. 16/866,520, filed on May 4, 2020, which is a continuation of U.S. patent application Ser. No. 16/024,587, filed on Jun. 29, 2018, now issued as U.S. Pat. No. 10,643,525 which is incorporated herein by reference.

BACKGROUND

Display interfaces can allow audio/video to be transmitted from a source device to a display device. Common types of display interfaces include, but are not limited to, High-Definition Multimedia Interface (HDMI), DisplayPort (DP), embedded DisplayPort (eDP), or Mobile Industry Processor Interface (MIPI) display serial interface (DSI). HDMI is a proprietary audio/video interface for transmitting uncompressed video data and compressed/uncompressed digital audio data from an HDMI-compliant source device, such as a display controller, to a compatible computer monitor, video projector, digital television or digital audio device. HDMI is a digital replacement for analog video standards. DisplayPort is a digital display interface that is standardized by the Video Electronics Standards Association (VESA). DisplayPort is an interface that is used to connect a video source to a display device, such as a computer monitor, and can carry audio and other forms of data. DisplayPort was designed to replace Video Graphics Array (VGA) and Digital Visual Interface (DVI). The DisplayPort interface is backward compatible with other interfaces, such as HDMI and DVI. eDP defines a standardized display panel interface for internal connections, e.g., graphics cards to notebook display panels. The MIPI DSI defines a high-speed serial interface between a host processor and a display module. The MIPI DSI enables manufacturers to integrate displays to achieve high performance and improved imagery and video scenes. The MIPI DSI is commonly used for displays in smartphones, tablets, laptops and vehicles.

BRIEF DESCRIPTION OF THE DRAWINGS

Features and advantages of technology embodiments will be apparent from the detailed description which follows, taken in conjunction with the accompanying drawings, which together illustrate, by way of example, technology features; and, wherein.

Figure 1:
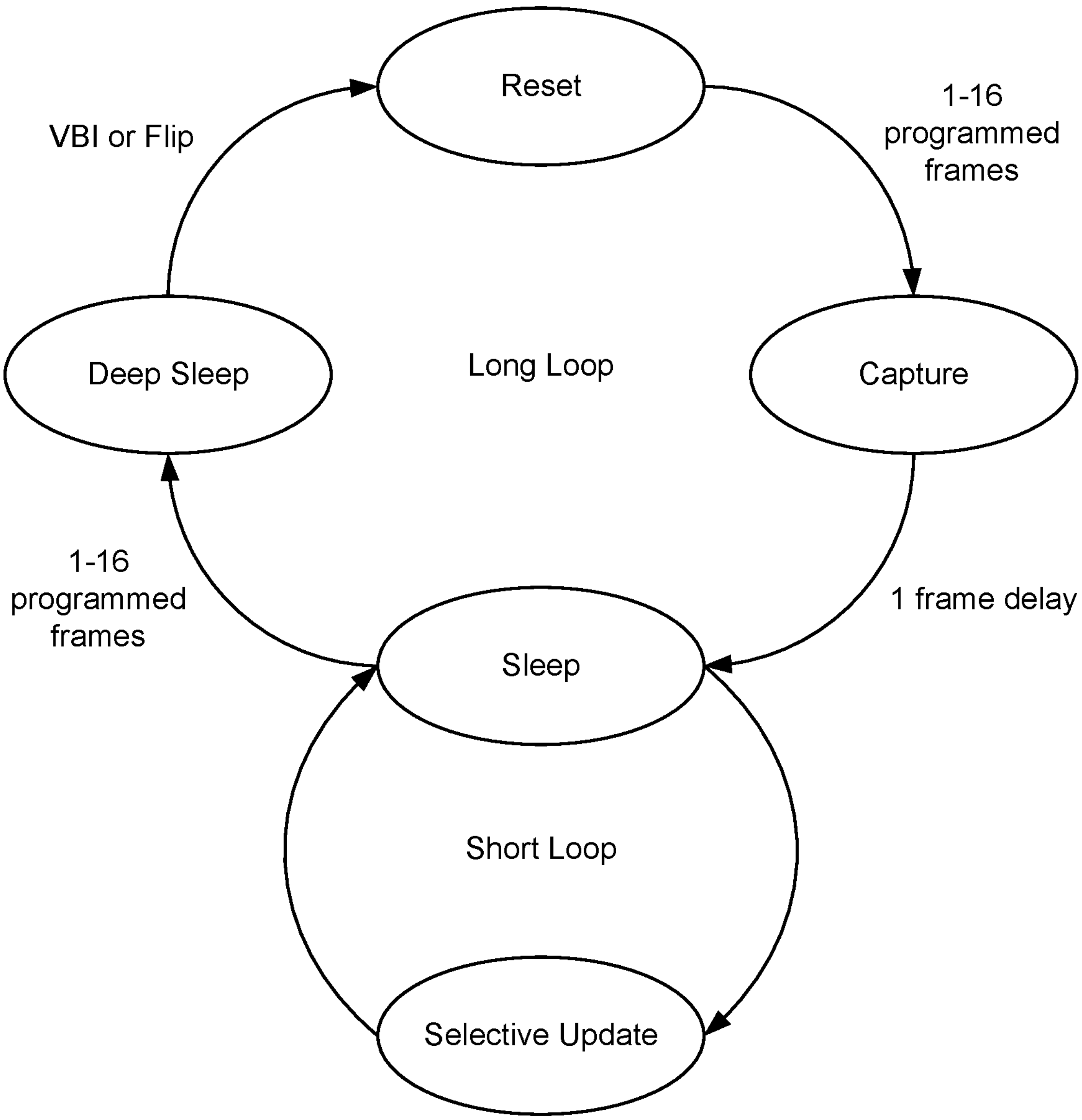
FIG. 1 illustrates a panel self-refresh 2 (PSR2) state machine in accordance with an example embodiment.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various technology embodiments. One skilled in the relevant art will recognize, however, that such detailed embodiments do not limit the overall technological concepts articulated herein, but are merely representative thereof.

As used in written description, the singular forms "a," "an" and "the" include express support for plural referents unless the context clearly dictates otherwise. Thus, for example, reference to "a circuit" includes a plurality of such circuits.

Reference throughout this specification to "an example" means that a particular feature, structure, or characteristic described in connection with the example is included in at least one embodiment of the present technology. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of technology embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "minimized," "maximized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

The present technology relates to a dynamic sleep state for embedded display panel (eDP), mobile industry processor interface (MIPI) and transport agnostic display (TAD) to lower a central processing unit (CPU) or a system on a chip (SoC) power consumption. The CPU/SoC power consumption can be lowered for key usages, such as web browsing, office productivity, video playback, etc. In prior solutions, for these use cases, a display engine (DE), also referred to herein as a display controller, would block certain package (PKG) CPU states (or C-states) due to inefficiencies in the CPU/SoC. In other words, in the prior solutions, certain deeper PKG C-states (e.g., PKG C10) would be prevented and only a reduced PKG C-state could be achieved (e.g., PKG C8), thus disallowing the SoC from entering the deepest PKG C-states and achieving the highest level of power efficiency. For example, the PKG C-states can range from C0 to C10, where C0 is a lowest sleep state (i.e., a state with the most amount of activity) and C10 is a deepest sleep state (i.e., a state with the least amount of activity). Thus, in the present technology, a panel self-refresh 2 (PSR2) mechanism can be enhanced to eliminate the CPU/SoC's dependency on the DE to achieve a lower power state (e.g., PKG C10) and to improve efficiency of the DE for active frames. The lower power state can be achieved using a dynamic sleep state, which can deliver a competitive low power CPU/SoC and satisfy power targets for next generation CPU/SoC's. In addition, the dynamic sleep state can also be extended to the MIPI and TAD protocols.

FIG. 1 illustrates an example of a PSR2 state machine, such as an eDP PSR2 state machine. A DE can start in a reset state, and after 1-16 programmed idle frames, the DE can enter into a capture state. The DE can stay in the capture state for one frame time, where a panel can copy a frame in its remote frame buffer for a panel self-refresh. During the capture state, the panel can refresh the panel or accept an update. After a capture frame time, the DE can enter a sleep state. The DE can remain in the sleep state for another 1-16 programmed idle frames before entering a deep sleep state. When the DE is in the deep sleep state, the CPU/SoC can enter a lower power state (e.g., PKG C10). When in the deep sleep state, a vertical blanking interrupt (VBI) or frame update (flip) can prompt the DE to return back to the reset state. The DE can be in the reset state, the capture state, the sleep state and the deep sleep state during a long loop. On the other hand, when in the sleep state and there is a frame update (flip), the DE can enter a selective update state and send updated scanlines to the panel. The DE can enter the selective update state during a short loop. During the short loop, partial frames can be sent, and not necessarily an entire frame has to be sent. During the short loop, if there is no update, the panel can update from its own frame buffer. While in the sleep state, when there is an update, the DE can enter the selective update state, and then return back to the sleep state.

In one example, during the short loop, the DE can maintain time synchronization with the panel, whereas in the deep sleep state of the long loop, time synchronization is not maintained between the DE and the panel. Thus, from the panel perspective, the panel is in a refresh state in both the long loop and the short loop, but whether the time synchronization is maintained can depend on the type of loop entered by the DE (i.e., long loop or short loop).

In one configuration, the previous PSR2 implementation had various issues that prevented the CPU/SoC from entering the lower power state (e.g., PKG C10). In the previous PSR2 implementation, PKG C8 was the lowest power state the CPU/SoC could achieve when the DE entered into the sleep state. The reason that only PKG C8 was achieved was that PSR2 necessitated that the DE maintain time synchronization with the panel in the sleep state, which resulted in the DE keeping on a phase locked loop (PLL) and timing generator circuit. By keeping the PLL and timing generator circuit on at the DE, both the DE and the CPU/SoC were prevented from entering the deepest PKG C-state (e.g., PKG C10) during the sleep state. Instead, the DE and the CPU/SoC were only able to enter a lower PKG C-state (e.g., PKG C8) during the sleep state, which is not as power efficient as the deepest PKG C-state. In the previous PSR2 implementation, the deepest PKG C-state (e.g., PKG C10) could only be achieved when the DE entered the deep sleep state.

In one example, an advantage of the sleep state is that the DE can perform a frame update during the short loop, and then return to the sleep state without additional frame overhead. An analysis on an hour of battery life (HoBL) workload has shown that a sleep state residency is 25% for office productivity and 50% for web browsing and video playback. This high sleep state residency is an opportunity for the CPU/SoC to enter the deepest PKG C-state (e.g., PKG C10). As discussed in further detail below, a dynamic sleep state can be enabled for the DE, such that a PKG can enter C10 during the dynamic sleep state to lower the CPU/SoC power consumption.

In one example, in the previous PSR2 implementation, there was a deep sleep state exit penalty to re-enter the sleep/selective update state (or a long loop penalty). When the DE was in the deep sleep state, the DE would wake up in the reset state with a VBI or frame update (flip). In the reset state, the DE would read and scan-out full frames and stay in the reset state for a programmed number of idle frames. For example, the DE would wait 1-16 frames before it could re-enter the sleep/selective update state, thereby resulting in a long loop penalty. The analysis of the HOBL workload has shown that office productivity suffers from the long loop penalty, as the workload has enough idleness to enter deep sleep, but frequent wakes result in increased reset state residency (e.g., an increase of 20% in reset state residency), which is a significant percentage of lost opportunity for power optimizations.

In one example, the previous PSR2 implementation suffered from inefficiency for active frames and partial updates. In the previous PSR2 implementation, the DE would operate during two active states, the reset state and the selective update state, during which frame updates would occur. In both of these active states, the DE would stay active for an entire frame time, even if there was a single pixel change, which can be inefficient. The analysis of the HOBL workload has shown an actual percentage of change within a frame to be significantly lower. For example, for web browsing, an average of 10% of the frame changes when there is a flip. For office productivity, an average of 4% of the frame changes when there is a flip. Telemetry data has shown that users are either browsing or running a productivity workload 70% of the time. Therefore, this is significant opportunity to improve the efficiency of the active frame. For example, as described in further detail below, the DE can stay active for only parts of the frame that are 'dirty', meaning that the DE can be active only for parts of the frame with changes or updates.

In one example, in the previous design of the CPU/SoC, the PKG C10 state is not supported for the MIPI command mode, since the DE did not have deep sleep support for MIPI. The MIPI command mode specification does enable panel self-refresh, selective read, and selective scan-out, but due to software implementation of the MIPI command mode, the DE had a limited set of power features. Therefore, dynamic sleep state techniques can be applied in the DE hardware implementation of MIPI command mode, thereby ensuring that the CPU/SoC provides a lower power MIPI solution.

In previous solutions, eDP PSR1 and PSR2 technology for CPU/SoC power saving supported deep sleep only in the long loop. However, in the present technology, the DE can support deep sleep even in the short loop, thereby achieving higher PKG C10 residency and lower power.

In one configuration, the eDP PSR2 can achieve the lower power state (e.g., PKG C10) by offloading phase-locked loop (PLL) and timer logic of the DE to a separate low power, always-on power rail. The always-on power rail can be associated with a separate power domain (or a "more on" power domain). In other words, the PLL and timer logic can be moved from the DE to the separate always-on power rail. The PSR2 specification necessitates the DE to keep the panel (e.g., an eDP panel) in time synchronization by sending the VBI every frame time. In the previous solution, the DE would use the PLL and timer logic to generate VBI ticks. The DE could halt the VBI ticks to save power and the panel could run on its own timing only in the deep sleep state. Based on the PSR2 specification requirement, in the previous solution, the lower power state (e.g., PKG C10) was unable to be achieved by the CPU/SoC in the sleep state since the DE had to maintain the time synchronization for the panel. However, by offloading the PLL and timer logic to the separate power domain, the deep sleep state can be enabled in PSR2 sleep and selective update states in the short loop, such that the UE can be woken up only for selective read and scan-out.

In one example, the MIPI command mode can define a VBI signal from the panel to the CPU/SoC for maintaining the timing. Here, a VBI signal from the CPU/SoC to the panel can be used to achieve time synchronization and improved power management. The PLL and timer logic can act as a scheduler for the DE by scheduling VBI and waking up on frame updates (flips).

In one configuration, the PLL and timer logic can be offloaded from the DE to the separate always-on power rail. The PLL and timer logic can include a timing generator that indicates when VBI is to occur. The PLL and timer logic can be running on a transmit clock. In past solutions, the PLL and timer logic would be part of the DE. In this solution, a copy of the PLL and timer logic can be placed (without the pipeline around the PLL and timer logic) in a standalone power rail. In this case, the always-on power rail can be suitable to hold the PLL and timer logic. The always-on power rail can remain on even when the DE is turned off. Thus, when the DE is turned off and the lower power state (e.g., PKG C10) is achieved, the timing between the DE and the panel can still be maintained by the always-on power rail associated with the separate power domain in accordance with the PSR2 specification requirement. By offloading the PLL and timer logic to the always-on power rail, the lower power state (e.g., PKG C10) can be achieved since the definition of PKG C10 is that all power rails except the always-on power rail are to be turned off. When the panel rejoins a stream, the panel can still operate at a same frequency, such as 60 Hertz (Hz). If the time synchronization is not maintained, when the panel wakes up, the panel can still operate at 60 Hz, but can be skewed by some time (e.g., skewed by half a frame). In one example, the time synchronization can be maintained using a local timing generator when the DE is on (e.g., in the capture state), and the PLL and timer logic that is offloaded to the always-on power rail can take over time synchronization duties when the DE and the CPU/SoC are in the lower sleep state, and the timing can be synchronized between the local timing generator and the PLL and timer logic offloaded to the always-on power rail.

In one configuration, the eDP PSR2 can program a VBI tick timer to wake up earlier than an actual VBI to account for hardware latencies, variable SW latencies and/or software jitters. Since the deep sleep state is being enabled in the short loop, the DE is to warm up hardware at every exit from the deep sleep state. This hardware latency can cause timer drift, resulting in visual artifacts. Thus, the hardware and software latencies can be calculated, and the timer can be programmed to wake earlier by the calculated time to avoid the timer drifts. Examples of hardware latency can include hardware wakeup and restore, input/output (IO) buffer enable, and link training latencies. An example of software latency can include re-programming of the timer.

Figure 2:
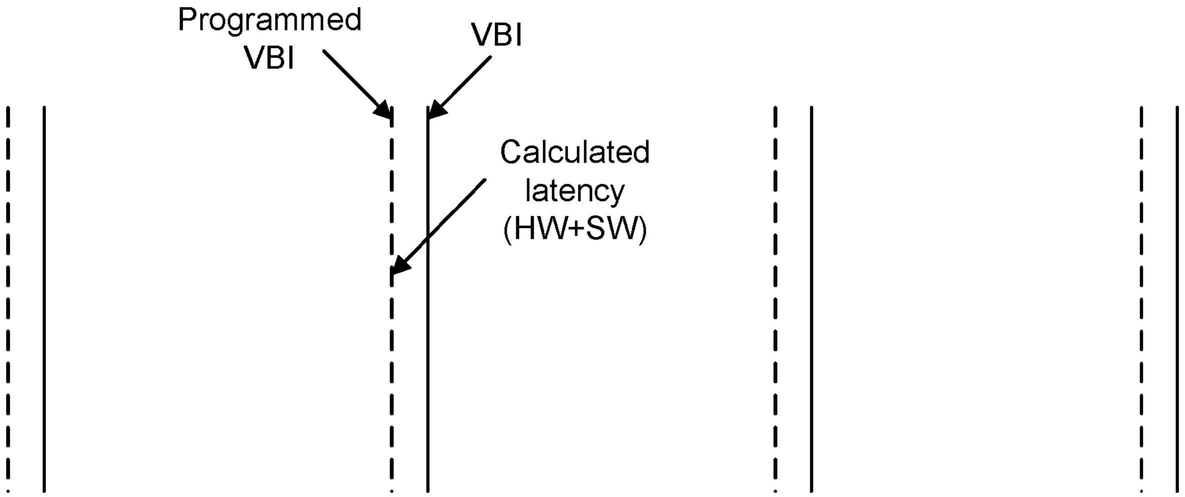
FIG. 2 illustrates a programmed vertical blanking interrupt (VBI) in accordance with an example embodiment.

FIG. 2 illustrates an example of a programmed vertical blanking interrupt (VBI). The programmed VBI can be earlier than an actual VBI to account for hardware and software latencies. Hardware and software latencies can be calculated to form a calculated time, and the programmed VBI can occur earlier than the actual VBI by the calculated time.

In one configuration, the eDP PSR2 can include a new deep sleep definition for a dynamic sleep state. With the offload of the PLL and timer logic to a separate power rail, the DE can support deep sleep in the sleep state with the VBI ticks on, and this new state can be referred to as a dynamic sleep state. Thus, there can be two deep sleep states-a first deep sleep state can include VBI ticks and can be referred to as the dynamic sleep state, and a second deep sleep state may be without VBI ticks and can be referred to as the deep sleep state (as shown in FIG. 1). Both deep sleep states can be equivalent in power consumption for the CPU/SoC, and can enable PKG C10. The dynamic sleep state can enable deep sleep in the short loop, so the DE can be programmed to operate indefinitely in the short loop. As the DE completes selective fetch and update, the DE can transition back to the dynamic sleep state in the same frame time. The DE can enter the deep sleep state only for connected standby/modern standby with panel on/off.

Figure 3:
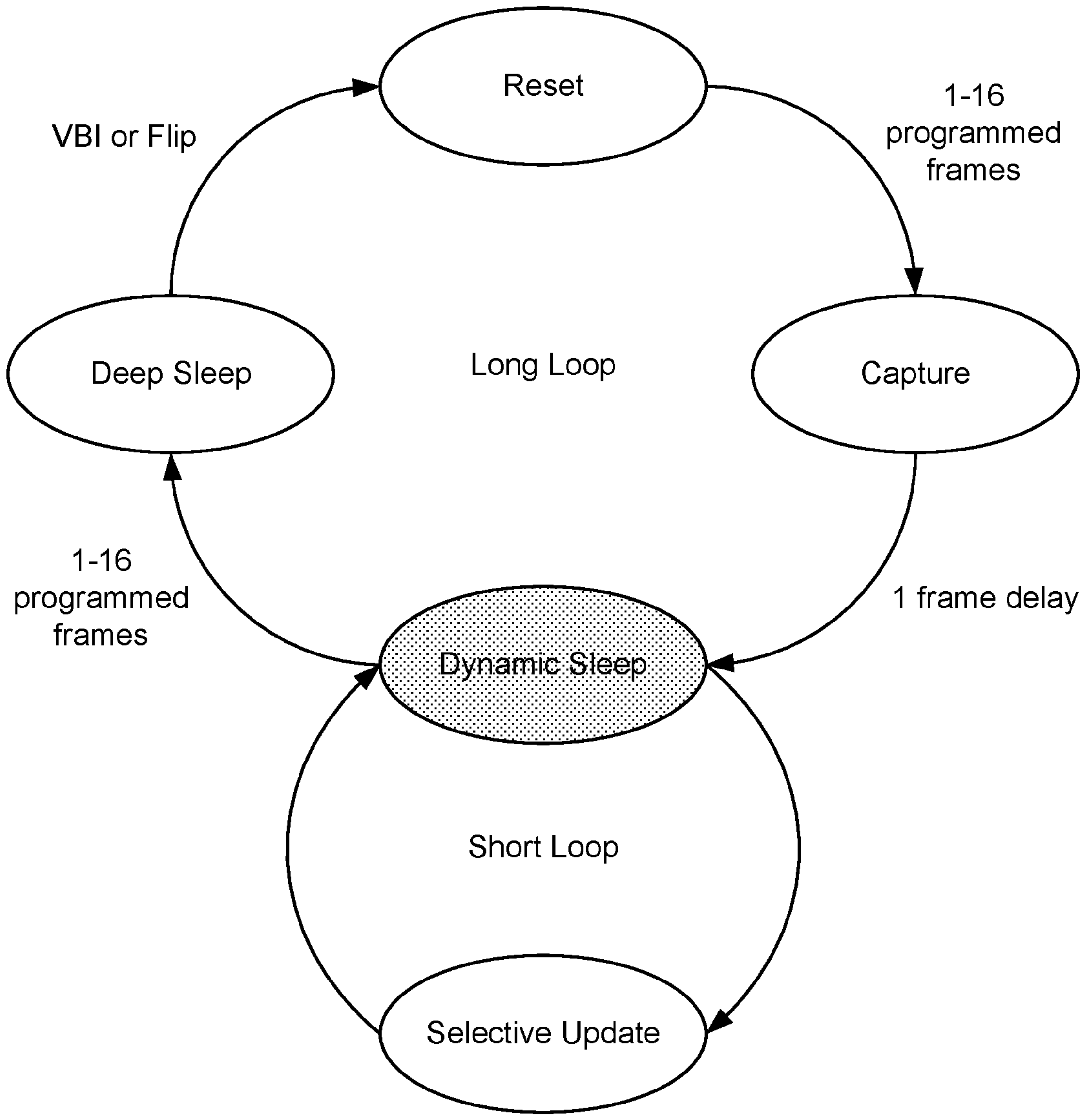
FIG. 3 illustrates an improved PSR2 state machine with a dynamic sleep state in accordance with an example embodiment.

FIG. 3 illustrates an example of an improved PSR2 state machine with a dynamic sleep state. A DE can start in a reset state, and after 1-16 programmed idle frames, the DE can enter into a capture state. The DE can stay in the capture state for one frame time, where a panel can copy a frame in its remote frame buffer for a panel self-refresh. During the capture state, the panel can refresh the panel or accept an update. After a capture frame time, the DE can enter a dynamic sleep state. During the dynamic sleep state, a lower power state (e.g., PKG C10) can be achieved for the CPU/SoC. The DE can remain in the dynamic sleep state for another 1-16 programmed idle frames before entering a deep sleep state. When the DE is in the deep sleep state, the CPU/SoC remains in the lower power state (e.g., PKG C10). When in the deep sleep state, a vertical blanking interrupt (VBI) or frame update (flip) can prompt the DE to return back to the reset state. The DE can be in the reset state, the capture state, the dynamic sleep state and the deep sleep state during a long loop. On the other hand, when in the dynamic sleep state and there is a frame update (flip), the DE can enter a selective update state and send updated scanlines to the panel. The DE can enter the selective update state during a short loop. During the short loop, partial frames can be sent, and not necessarily an entire frame has to be sent. During the short loop, if there is no update, the panel can update from its own frame buffer. While in the dynamic sleep state, when there is an update, the DE can enter the selective update state, and then return back to the dynamic sleep state.

In one configuration, the dynamic sleep techniques described above can be extended to the MIPI command mode, as well as to TAD, to reduce the CPU/SoC power consumption. In one example, some of the PSR2 eDP panels can have higher power for scenarios such as full screen video playback. In addition, in past solutions, the CPU/SoC did not have near term low power support for MIPI command mode. Therefore, the techniques described above can be extended with assistance from a display accelerator (DA), which can provide lower power for a MIPI command mode panel and PSR2 features with a non-PSR panel (which can lower panel cost).

In one example, CPU/SoC power consumption of media playback can be monitored. The offloading of the PLL and timer logic in the DE can be offloaded can be detected by determining whether the CPU/SoC is able to achieve a lowest power state for 30 frames per second (FPS) media playback on alternate frames (frames with no updates). In another example, VBI timer tick programming to wake earlier than an actual VBI can be detected by monitoring a CPU/SoC wake up from the sleep state on alternate frames for 30 FPS media playback. When the SoC is programmed to wake up early, the CPU/SoC can wake up before the VBI interrupt, whereas in previous solutions, the VBI interrupt would wake up the CPU/SoC. In yet another example, the dynamic sleep state can be detected by monitoring active CPU/SoC power for windowed media playback. The active power can be proportional to a window size of media playback, and CPU/SoC power can increase or decrease when the window size is changed, respectively.

In one example, analysis on HoBL web browsing and office productivity has shown that more than 60% of frames are idle, when there are frame updates 99% of the frames have partial updates, and only 5-10% of those frames have changed. Hence, the dynamic sleep state feature can result in significant CPU/SoC power savings (e.g., an increase of 20-30% in CPU/SoC power saving).

Figure 4:
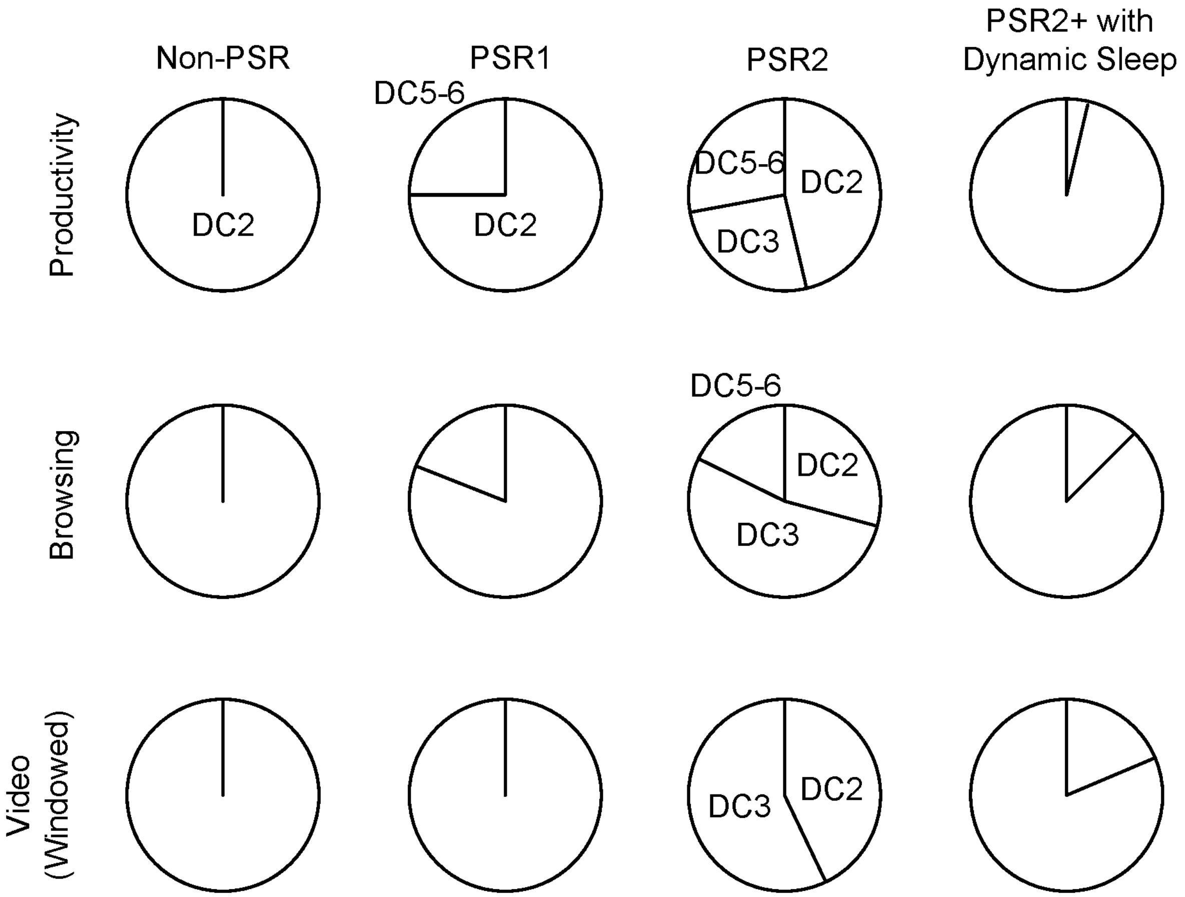
FIG. 4 illustrates dynamic sleep emulation results in accordance with an example embodiment.

FIG. 4 illustrates an example of dynamic sleep emulation results. The emulation is of the DE PSR2 state machines and the new proposed states. As shown, the new dynamic sleep state can have 90+% residency for HoBL web browsing and productivity, and the underlining PKG can be in C10 during this time when nothing else is active. In addition, the dynamic sleep state can significantly reduce a DE read and eDP input/output (IO) bandwidth (BW). For HoBL web browsing, the DE read BW can drop 60% and the eDP IO BW can drop 30%. For HoBL productivity, there can be a 80% drop in both the DE read BW and the eDP IO BW. The bandwidth reduction can provide an additional power saving from the CPU/SoC and memory, thereby enabling delivery of competitive low power CPU/SoC for typical usages.

In one configuration, an eDP PSR2 state machine can be enhanced to include a dynamic sleep state for lowering CPU/SoC power consumption. To enable the dynamic sleep state, a PLL and timer logic can be offloaded from the DE to a separate always-on power rail for VBI tick generation, a VBI tick timer can be programmed to wake earlier than an actual VBI to account for hardware latencies and software jitter, and a new sleep state referred to as a dynamic sleep state can be defined which enables deep sleep with VBI ticks. Furthermore, an operating system (OS) can provide 'dirty' region coordinates along with a flip for selective fetch and selective update. The dirty region coordinates can indicate regions in a new frame that have changed or updated with respect to a previous frame. Thus, the DE can fetch only regions that are dirty and sends these dirty regions to the panel. In addition, with respect to the panel (e.g., eDP panel), further power enhancements can be achieved when the panel is asynchronous. For example, a signal can be used to inform the panel of dirty scanlines, which allows frame updates to be sent at the VBI, and a link can be turned off after transfer of the dirty scanlines to lower the CPU/SoC and panel power consumption.

In one example, the DE can begin in the reset state, and after respective idle frames (which are programmed by the panel), the DE can enter the capture state and then to the new dynamic sleep state. When in the dynamic sleep state, the CPU/SoC can enter a lower power state (e.g., PKG C10), and will remain in the lower power state until there are interrupts to wake up the CPU/SoC. With the dynamic sleep state, the DE VBI interrupts will no longer wake up the CPU/SoC.

In one example, the eDP PSR2 state machine can be programmed to stay in the dynamic sleep state indefinitely (e.g., for a display on scenario), such that the DE does not pay a long loop tax when the DE wakes up from the deep sleep state. With the dynamic sleep state, the DE can wake into a selective state, and can return back to sleep immediately after the frame update. The DE can exit the short loop only for connected standby/modern standby and screen off scenarios.

In one example, a display driver can use reported dirt region coordinates (e.g., from the OS) to calculate scanlines that are dirty, and program the DE to read and scan-out only those dirty scanlines, such that the DE can enter the dynamic sleep state after processing a last active scanline. The dynamic sleep state can seamlessly support scenarios with multiple dirty region in a single surface or multiple surfaces.

In one example, by using a TAD asynchronous presentation time stamp framework, the DE can process frame updates right after a flip, which can improve energy efficiency as CPU/SoC activities will be combined, thereby resulting in longer dynamic sleep. In addition, a display accelerator (DA) can be used for display and other low power features, and can enable a low power MIPI command mode and PSR2 with non-PSR panels.

In one configuration, with respect to a default PSR2, the DE can wake every VBI, and the DE can check whether there are any flips pending. For example, when there is a flip, the DE can wake up and start fetching the frame and check for dirty scanlines. As an example, the DE can determine that the dirty scanline is in a middle of the frame, and the DE can scan-out those lines. The DE can stay in a selective state for an entire frame time, as the DE can fetch the entire frame to search for the dirty region.

Figure 5:
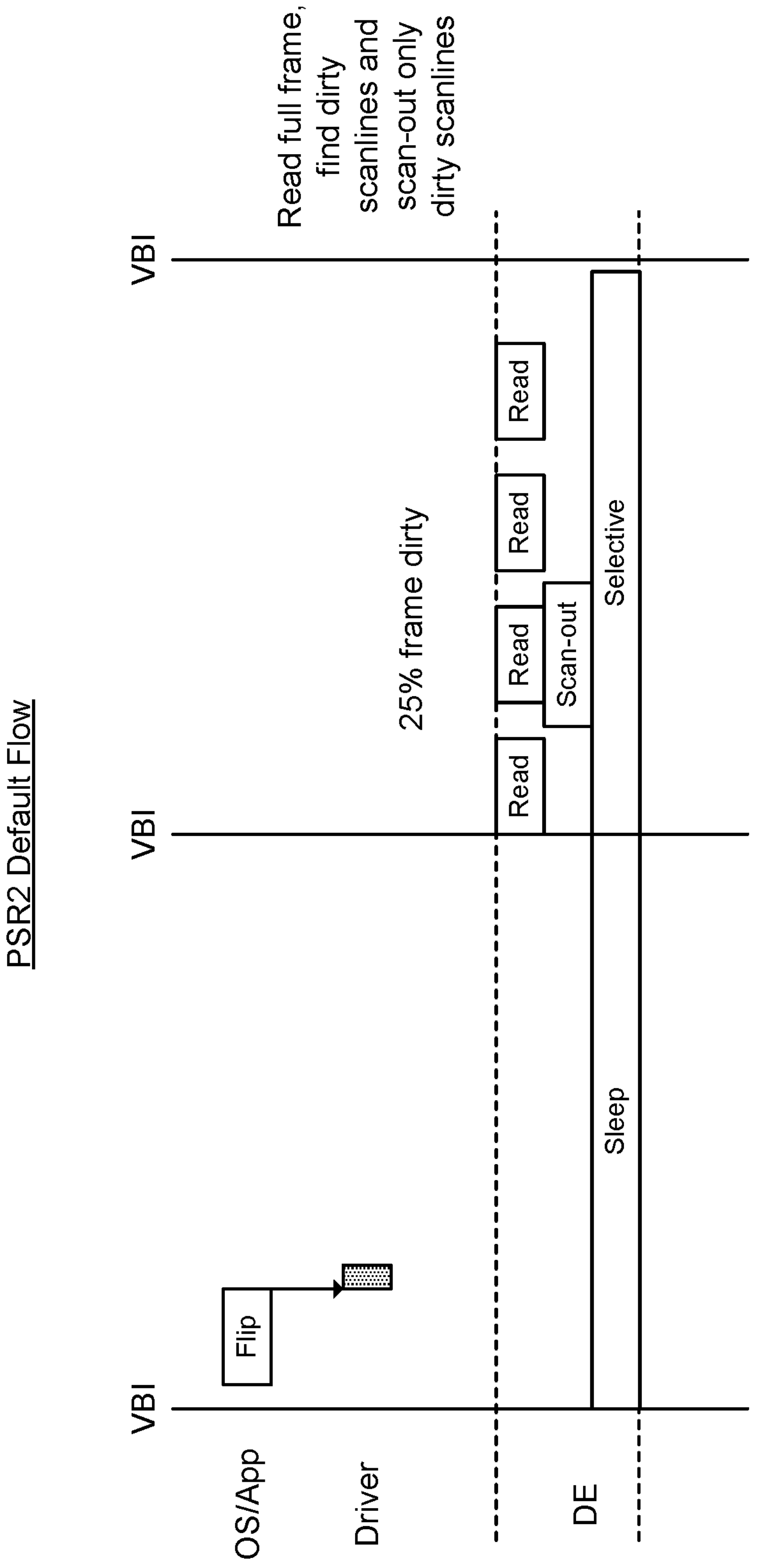
FIG. 5 illustrates a PSR2 default flow in accordance with an example embodiment.

FIG. 5 illustrates an example of a PSR2 default flow. A flip can be pending after a first VBI when a DE is in a dynamic sleep state. After a second VBI, the DE can enter a selective update state. During the selective update state, the DE can read a full frame, identify 'dirty' scanlines (e.g., regions that have been changed or updated with respect to a previous frame) and scan-out only the dirty scanlines. In this example, the DE can be assumed to be in a PSR2 dynamic sleep state, and there can be a flip with 25% dirty scanline in the middle of the frame.

In one configuration, with respect to a synchronous dynamic sleep state, panels (e.g., eDP PSR2 panels) can be synchronous and time synchronization can be driven by the DE. In this case, when there is a flip pending, the DE can be woken up at a calculated VBI (e.g., a calculated time earlier than an actual VBI), and the DE can read and scan-out the dirty scanlines synchronously with panel timings. When the DE has finished scan-out of the last dirty scanline, the DE can enter the dynamic sleep state.

Figure 6:
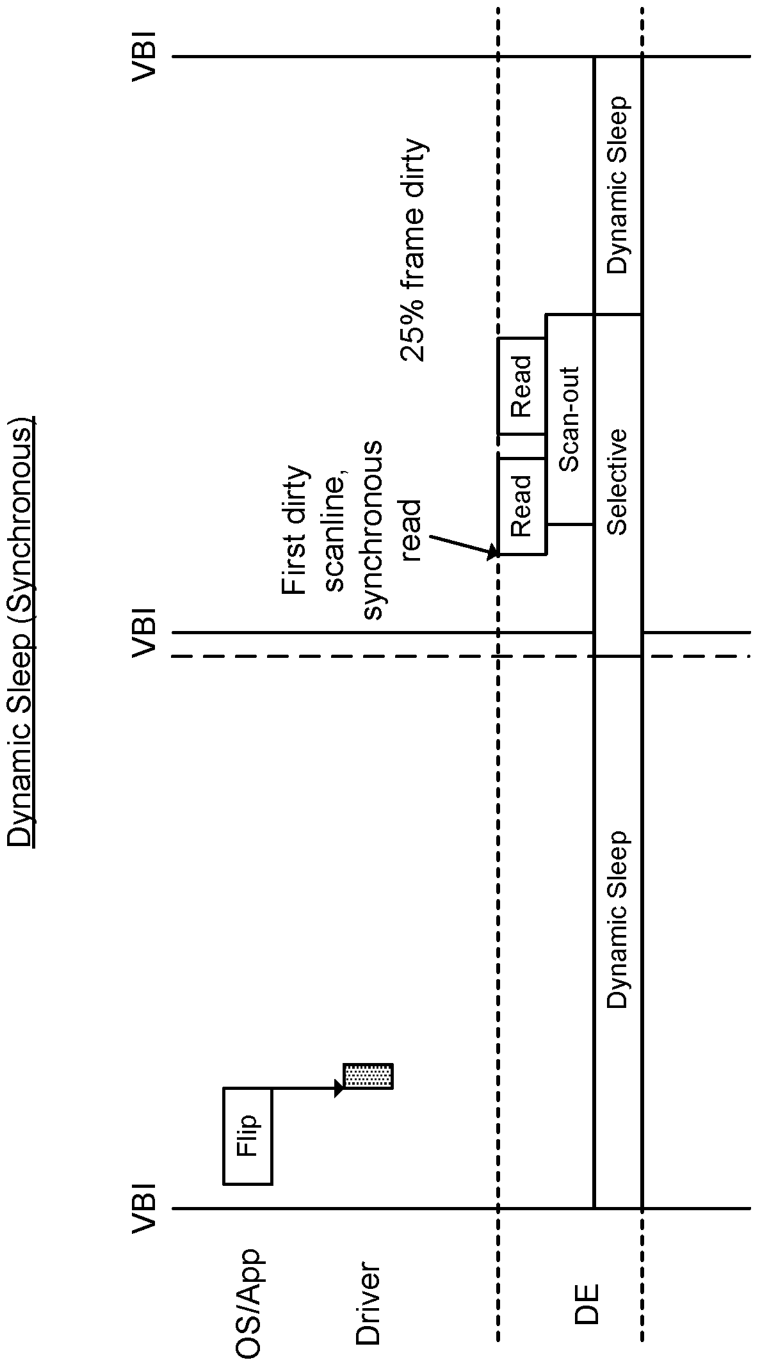
FIG. 6 illustrates a dynamic sleep flow with synchronous operation in accordance with an example embodiment.

FIG. 6 illustrates an example of a dynamic sleep flow with synchronous operation. A flip can be pending after a first VBI when a DE is in a dynamic sleep state. The DE can enter a selective update state at a calculated VBI, which can be earlier than a second VBI (an actual VBI). The DE can identify a first dirty scanline with a synchronous read. The DE can identify dirty scanlines and scan-out the dirty scanlines. In this example, 25% of the frame can be dirty. When the DE has finished scan-out of the last dirty scanline, the DE can return to the dynamic sleep state.

In one configuration, with respect to an asynchronous dynamic sleep state, a signal can be sent from the DE to the panel (e.g., an eDP PSR2 panel) to notify of dirty updates and send the update immediately. When there is a flip pending, the DE can be programmed to wake up and operate at prior to the actual VBI (e.g., a calculated latency earlier than the actual VBI). The DE can start fetching the dirty scanlines, and the DE can start scan-out at the second VBI. When all of the dirty scanlines are sent, the DE can enter the dynamic sleep state and an eDP link can be turned off.

In one example, the asynchronous dynamic sleep state can be more power efficient than the synchronous dynamic sleep state, but the asynchronous dynamic sleep state necessitates that a signal be sent to the panel to inform of dirty scanlines.

In one example, the MIPI command mode can benefit with the asynchronous dynamic sleep state, as the MIPI command mode supports asynchronous operations.

Figure 7:
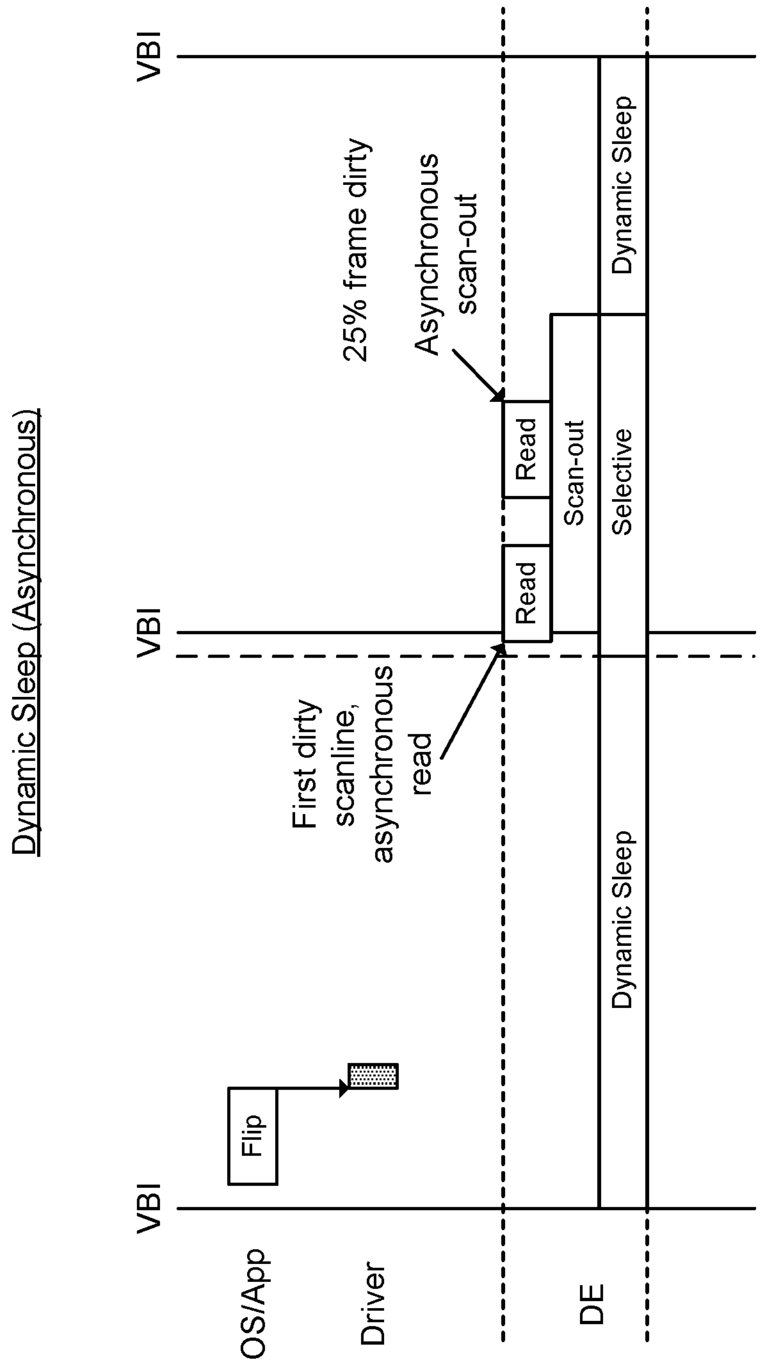
FIG. 7 illustrates a dynamic sleep flow with asynchronous operation in accordance with an example embodiment.

FIG. 7 illustrates an example of a dynamic sleep flow with asynchronous operation. A flip can be pending after a first VBI when a DE is in a dynamic sleep state. The DE can enter a selective update state at a calculated VBI, which can be earlier than a second VBI (an actual VBI). The DE can identify a first dirty scanline with an asynchronous read. The DE can identify dirty scanlines and perform an asynchronous scan-out of the dirty scanlines. The scan-out can begin at the second VBI. In this example, 25% of the frame can be dirty. When the DE has finished scan-out of the last dirty scanline, the DE can return to the dynamic sleep state.

In one example, with respect to the synchronous dynamic sleep state, the panel can expect data to arrive at its exact time. In other words, the panel can expect the data to be sent right when the data it is to be presented, so it is considered to be synchronous. When a certain percentage of the frame is dirty and a dirty portion is in the middle of the frame, the DE is to stay awake and read and scan-out when the time comes. After the read and scan-out are finished, the DE can enter the dynamic sleep state. In contrast, with respect to the asynchronous dynamic sleep state, the panel has the capability to accept a dirty region at the start of the frame, which enables an extended period of dynamic sleep. For example, the DE can wake up, read the dirty scanlines and scan-out, and then can go back to the dynamic sleep state.

In one configuration, with respect to a dynamic sleep state for asynchronous TAD, TAD can be used to further improve power efficiency and extend the dynamic sleep state to next generation TAD compliant external displays. TAD can allow the display to be asynchronous by defining a presentation time stamp (PTS) for each frame, rather than being VBI driven. With TAD, since each frame can have a PTS, the DE can scan-out the frame at the flip, rather than waiting for a VBI. As a result, CPU/SoC activities can be combined, thereby resulting in higher power efficiency. As an example, with TAD, the DE can read and scan-out the frame immediately after the flip, as opposed to the DE operating at the VBI. In this example, the OS can be ensured to send flips on all surfaces at once or within a fixed time window (e.g., a few milliseconds).

Figure 8:
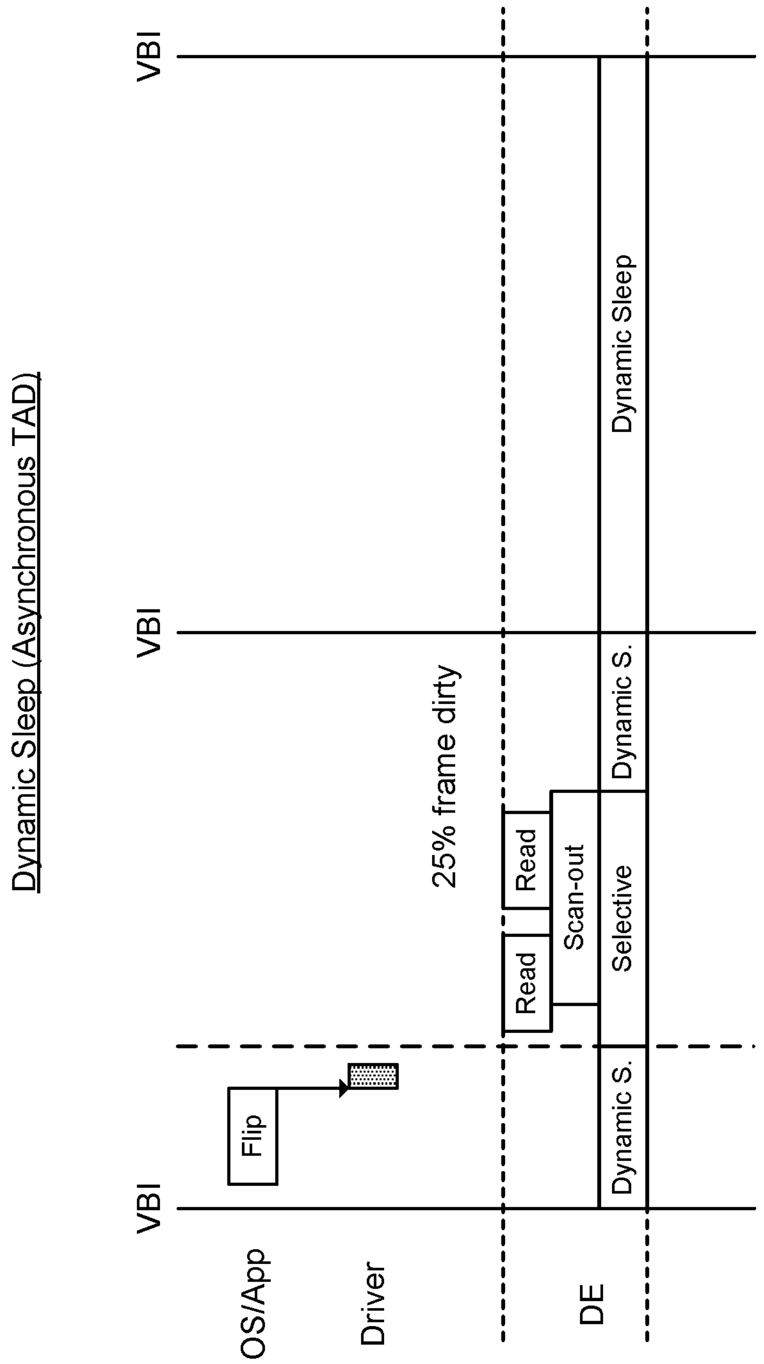
FIG. 8 illustrates a dynamic sleep flow with asynchronous transport agnostic display (TAD) operation in accordance with an example embodiment.

FIG. 8 illustrates an example of a dynamic sleep flow with asynchronous TAD operation. A flip can be pending after a first VBI when a DE is in a dynamic sleep state. The DE can enter a selective update state immediately after the flip. The DE can identify dirty scanlines and scan-out the dirty scanlines. In this example, 25% of the frame can be dirty. When the DE has finished scan-out of the last dirty scanline, the DE can return to the dynamic sleep state. In this example, since the DE can enter the selective update state immediately after the flip, the DE can finish the read and scan-out prior to a second VBI.

In one configuration, the dynamic sleep state can be achieved using a display accelerator (DA). For example, some existing PSR2 panels can have an additional power cost in a PSR2 mode. The DA can enable support of a MIPI command mode and PSR2 without the additional panel cost and power. The DA can have a full frame buffer to drive the panel, and the DA can be positioned between the DE and the panel. The DA can be an asynchronous device to the DE, and can drive the eDP/MIPI panel. Further, CPU/SoC power benefits can be achieved, similar to TAD, by using the PTS to combine CPU/SoC activities and increase dynamic sleep.

Figure 9:
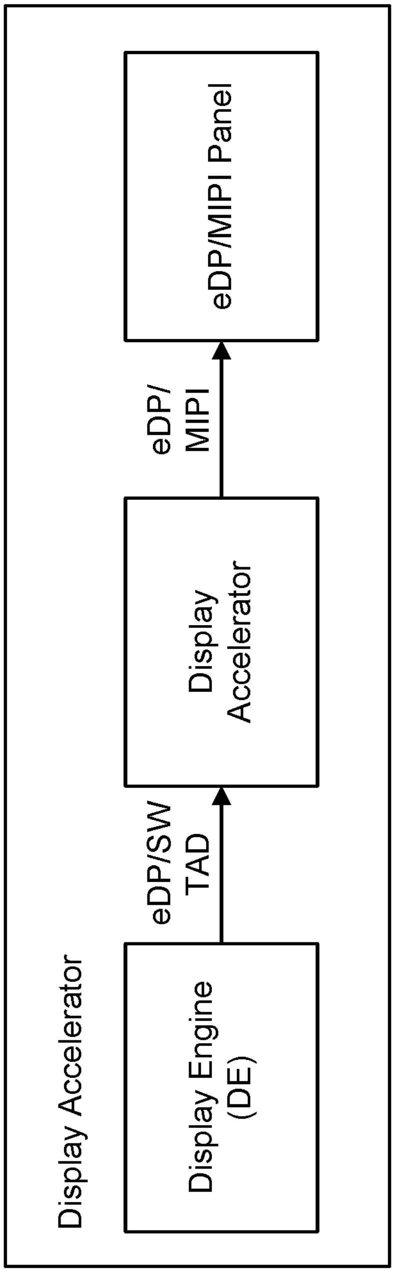
FIG. 9 illustrates a display accelerator with dynamic sleep in accordance with an example embodiment.

FIG. 9 illustrates an example of a display accelerator (DA). The DA can be positioned between a DE and a panel (e.g., an eDP/MIPI panel). The DA can enable support of a MIPI command mode and PSR2. The DA can be an asynchronous device to the DE, and can drive the eDP/MIPI panel.

Figure 10:
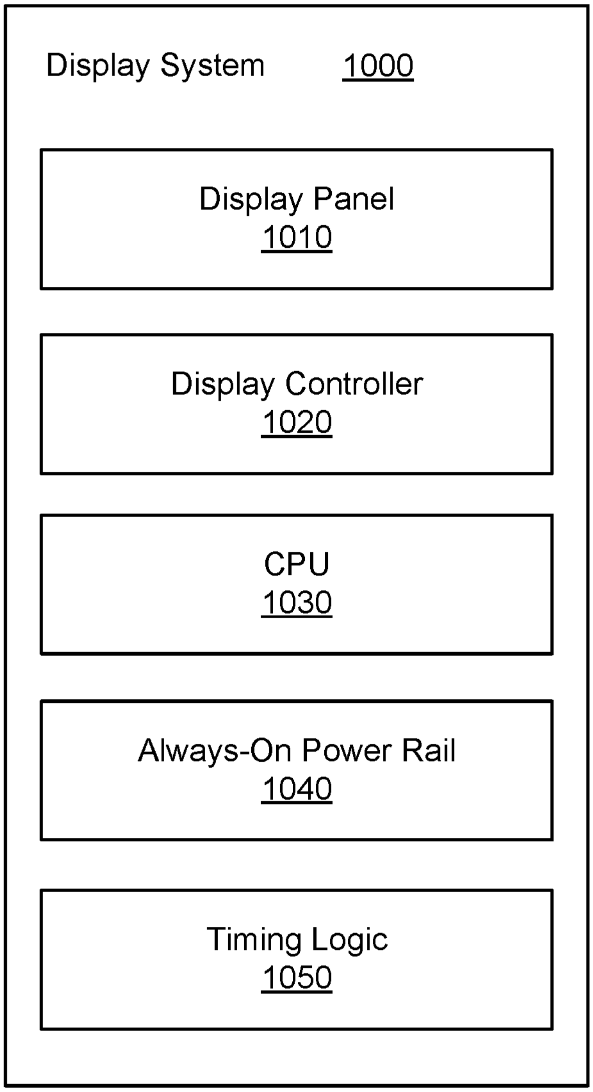
FIG. 10 illustrates a display system in accordance with an example embodiment.
Figure 11:
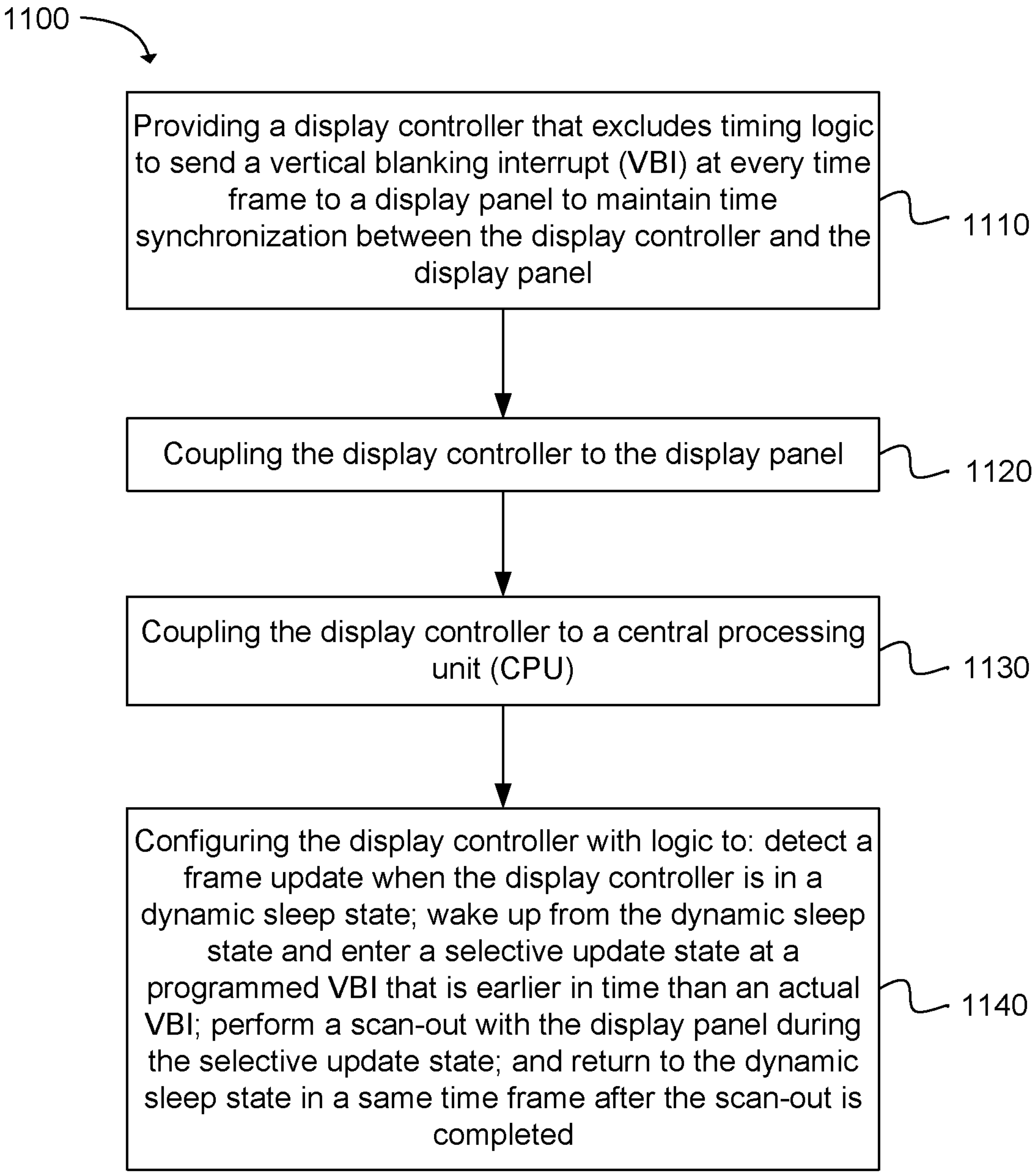
FIG. 11 is a flowchart illustrating operations for making a display system in accordance with an example embodiment.
Figure 12:
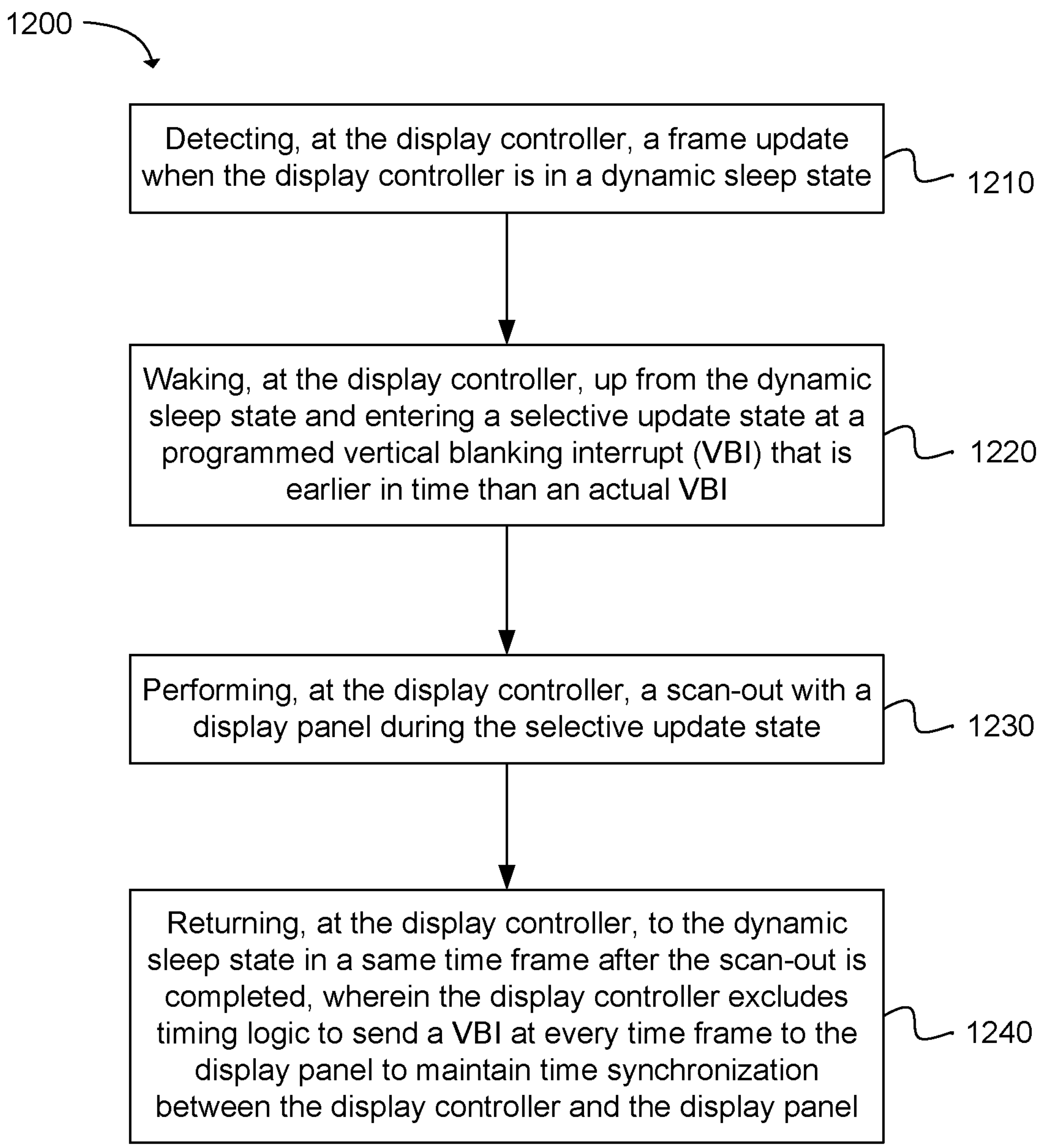
FIG. 12 is a flowchart illustrating operations for operating in a dynamic sleep state at a display controller in accordance with an example embodiment.

FIG. 10 illustrates a display system 1000. The display system 1000 can include a display panel 1010, a display controller 1020 coupled to the display panel 1010, a central processing unit (CPU) 1030 coupled to the display controller 1020, an always-on power rail 1040 and timing logic 1050. The CPU 1030 can be associated with the always-on power rail 1040. The display controller 1020 can include logic to detect a frame update when the display controller 1020 is in a dynamic sleep state. The display controller 1020 can include logic to wake up from the dynamic sleep state and enter a selective update state at a programmed vertical blanking interrupt (VBI) that is earlier in time than an actual VBI. The display controller 1020 can include logic to perform a scan-out with the display panel 1010 during the selective update state. The display controller 1020 can include logic to return to the dynamic sleep state in a same time frame after the scan-out is completed. In addition, the timing logic 1050 can send the VBI at every time frame to the display panel 1010 to maintain time synchronization between the display controller 1020 and the display panel 1010, and the timing logic 1050 can be included in the always-on power rail 1040.

Another example provides a method 1100 for making a display system. The method can be executed as instructions on a machine, where the instructions are included on at least one computer readable medium or one non-transitory machine readable storage medium. The method can include the operation of: providing a display controller that excludes timing logic to send a vertical blanking interrupt (VBI) at every time frame to a display panel to maintain time synchronization between the display controller and the display panel, as in block 1110. The method can include the operation of: coupling the display controller to the display panel, as in block 1120. The method can include the operation of: coupling the display controller to a central processing unit (CPU), as in block 1130. The method can include the operation of: configuring the display controller with logic to: detect a frame update when the display controller is in a dynamic sleep state; wake up from the dynamic sleep state and enter a selective update state at a programmed VBI that is earlier in time than an actual VBI; perform a scan-out with the display panel during the selective update state; and return to the dynamic sleep state in a same time frame after the scan-out is completed, as in block 1140.

Another example provides a method 1200 for operating in a dynamic sleep state at a display controller. The method can be executed as instructions on a machine, where the instructions are included on at least one computer readable medium or one non-transitory machine readable storage medium. The method can include the operation of: detecting, at the display controller, a frame update when the display controller is in a dynamic sleep state, as in block 1210. The method can include the operation of: waking, at the display controller, up from the dynamic sleep state and entering a selective update state at a programmed vertical blanking interrupt (VBI) that is earlier in time than an actual VBI, as in block 1220. The method can include the operation of: performing, at the display controller, a scan-out with a display panel during the selective update state, as in block 1230. The method can include the operation of: returning, at the display controller, to the dynamic sleep state in a same time frame after the scan-out is completed, wherein the display controller excludes timing logic to send a VBI at every time frame to the display panel to maintain time synchronization between the display controller and the display panel, as in block 1240.

Figure 13:
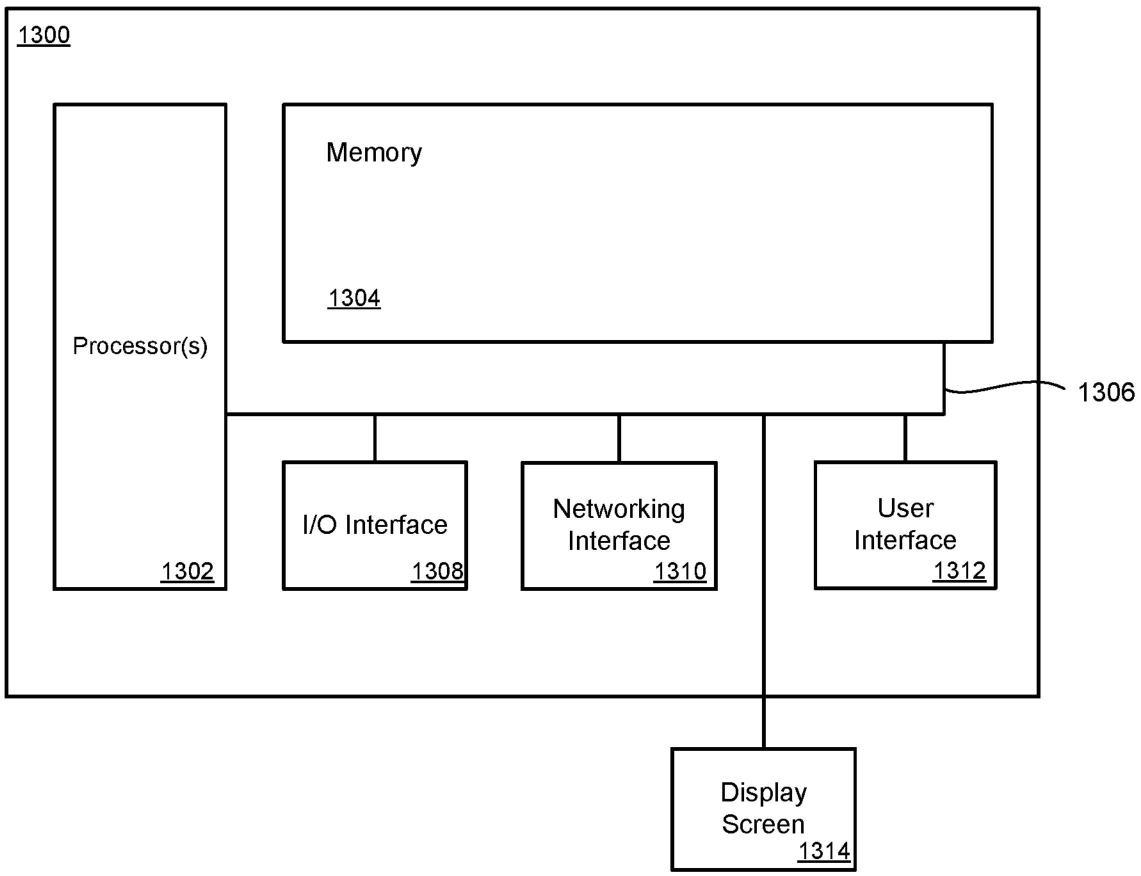
FIG. 13 illustrates a computing system that includes a data storage device in accordance with an example embodiment.

FIG. 13 illustrates a general computing device 1300 that can be employed in the present technology. The computing device 1300 can include a processor 1302 in communication with a memory 1304. The memory 1304 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing device 1300 additionally includes a local communication interface 1306 for connectivity between the various components of the system. For example, the local communication interface 1306 can be a local data bus and/or any related address or control busses as may be desired.

The computing device 1300 can also include an I/O (input/output) interface 1308 for controlling the I/O functions of the system, as well as for I/O connectivity to devices outside of the computing device 1300. A network interface 1310 can also be included for network connectivity. The network interface 1310 can control network communications both within the system and outside of the system. The network interface can include a wired interface, a wireless interface, a Bluetooth interface, optical interface, and the like, including appropriate combinations thereof. Furthermore, the computing device 1300 can additionally include a user interface 1312, a display device 1314, as well as various other components that would be beneficial for such a system.

The processor 1302 can be a single or multiple processors, and the memory 1304 can be a single or multiple memories. The local communication interface 1306 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific technology embodiments and point out specific features, elements, or steps that can be used or otherwise combined in achieving such embodiments.

In one example, there is provided a display controller, comprising logic to: detect a frame update when the display controller is in a dynamic sleep state; wake up from the dynamic sleep state and enter a selective update state at a programmed vertical blanking interrupt (VBI) that precedes an actual VBI; perform a scan-out with a display panel during the selective update state; and return to the dynamic sleep state in a same time frame after the scan-out is completed, wherein the display controller excludes timing logic to send a VBI at every time frame to the display panel to maintain time synchronization between the display controller and the display panel.

In one example of the display controller, the timing logic to send the VBI at every time frame to the display panel that is excluded from the display controller is associated with a separate power domain with an always-on power rail that is accessible to the display controller.

In one example of the display controller, the display controller and a central processing unit (CPU) coupled to the display controller enter a reduced power consumption package (PKG) CPU state (C-state) when the display controller is in the dynamic sleep state.

In one example of the display controller, the reduced power consumption PKG C-state is achieved when all power rails are turned off except an always-on power rail that includes the timing logic to send the VBI at every time frame to the display panel, thereby enabling the display controller and the CPU to enter the reduced power consumption PKG C-state during the dynamic sleep state while the time synchronization between the display controller and the display panel is separately maintained using the always-on power rail.

In one example of the display controller, the display controller further comprises logic to: start performing the scan-out after the actual VBI when the display panel operates in a synchronous mode or at the actual VBI when the display panel operates in an asynchronous mode; and complete the scan-out after the actual VBI.

In one example of the display controller, the programmed VBI that is earlier in time than the actual VBI is determined based on a calculated hardware latency and software latency.

In one example of the display controller, the display controller further comprises logic to: start performing the scan-out immediately after detection of the frame update and prior to the actual VBI; and complete the scan-out prior to the actual VBI.

In one example of the display controller, the logic to perform the scan-out during the selective update state further comprises logic to: fetch a new frame; identify changed scanlines of the new frame; and send the changed scanlines of the new frame to the display panel.

In one example of the display controller, the display controller is coupled to a display accelerator that drives the display panel.

In one example of the display controller, the display controller is configured for the dynamic sleep state using one or more of: an embedded DisplayPort (eDP) protocol, a Mobile Industry Processor Interface (MIPI) protocol or a transport agnostic display (TAD) protocol.

In one example, there is provided a display system, comprising: a display panel; a display controller coupled to the display panel; and a central processing unit (CPU) coupled to the display controller, wherein the CPU is associated with an always-on power rail; wherein the display controller comprises logic to: detect a frame update when the display controller is in a dynamic sleep state; wake up from the dynamic sleep state and enter a selective update state at a programmed vertical blanking interrupt (VBI) that is earlier in time than an actual VBI; perform a scan-out with the display panel during the selective update state; and return to the dynamic sleep state in a same time frame after the scan-out is completed, wherein timing logic to send the VBI at every time frame to the display panel to maintain time synchronization between the display controller and the display panel is included in the always-on power rail.

In one example of the display system, the timing logic to send the VBI at every time frame to the display panel to maintain time synchronization between the display controller and the display panel is excluded from the display controller and is associated with a separate power domain with the always-on power rail that is accessible to the display controller.

In one example of the display system, the display controller and the CPU enter a reduced power consumption PKG CPU state (C-state) when the display controller is in the dynamic sleep state.

In one example of the display system, the reduced power consumption PKG C-state is achieved when all power rails are turned off except the always-on power rail that includes the timing logic to send the VBI at every time frame to the display panel, thereby enabling the display controller and the CPU to enter the reduced power consumption PKG C-state during the dynamic sleep state while the time synchronization between the display controller and the display panel is separately maintained using the always-on power rail.

In one example of the display system, the display controller further comprises logic to: start performing the scan-out after the actual VBI when the display panel operates in a synchronous mode or at the actual VBI when the display panel operates in an asynchronous mode; and complete the scan-out after the actual VBI.

In one example of the display system, the programmed VBI that is earlier in time than the actual VBI is determined based on a calculated hardware latency and software latency.

In one example of the display system, the display controller further comprises logic to: start performing the scan-out immediately after detection of the frame update and prior to the actual VBI; and complete the scan-out prior to the actual VBI.

In one example of the display system, the logic in the display controller to perform the scan-out during the selective update state further comprises logic to: fetch a new frame; identify changed scanlines of the new frame; and send the changed scanlines of the new frame to the display panel.

In one example of the display system, the display system further comprises a display accelerator that is positioned in between the display controller and the display panel.

In one example of the display system, the display controller is configured for the dynamic sleep state using one or more of: an embedded DisplayPort (eDP) protocol, a Mobile Industry Processor Interface (MIPI) protocol or a transport agnostic display (TAD) protocol.

In one example, there is provided a method of making a display system, the method comprising: providing a display controller that excludes timing logic to send a vertical blanking interrupt (VBI) at every time frame to a display panel to maintain time synchronization between the display controller and the display panel; coupling the display controller to the display panel; coupling the display controller to a central processing unit (CPU); and configuring the display controller with logic to: detect a frame update when the display controller is in a dynamic sleep state; wake up from the dynamic sleep state and enter a selective update state at a programmed VBI that is earlier in time than an actual VBI; perform a scan-out with the display panel during the selective update state; and return to the dynamic sleep state in a same time frame after the scan-out is completed.

In one example of the method of making the display system, the method further comprises configuring the CPU to be associated with an always-on power rail that includes timing logic to send the VBI at every time frame to the display panel, wherein the timing logic is associated with a separate power domain with the always-on power rail that is accessible to the display controller.

In one example of the method of making the display system, the method further comprises configuring the display controller and the CPU to enter a reduced power consumption package (PKG) CPU state (C-state) when the display controller is in the dynamic sleep state.

In one example of the method of making the display system, the reduced power consumption PKG C-state is achieved when all power rails are turned off except an always-on power rail that includes the timing logic to send the VBI at every time frame to the display panel, thereby enabling the display controller and the CPU to enter the reduced power consumption PKG C-state during the dynamic sleep state while the time synchronization between the display controller and the display panel is separately maintained using the always-on power rail.

In one example of the method of making the display system, the programmed VBI that is earlier in time than the actual VBI is determined based on a calculated hardware latency and software latency.

In one example of the method of making the display system, the method further comprises coupling a display accelerator to the display controller to drive the display panel.

In one example of the method of making the display system, the display controller is configured for the dynamic sleep state using one or more of: an embedded DisplayPort (eDP) protocol, a Mobile Industry Processor Interface (MIPI) protocol or a transport agnostic display (TAD) protocol.

In one example, there is provided at least one non-transitory machine readable storage medium having instructions embodied thereon for operating in a dynamic sleep state, the instructions when executed by a display controller perform the following: detecting, at the display controller, a frame update when the display controller is in a dynamic sleep state; waking, at the display controller, up from the dynamic sleep state and entering a selective update state at a programmed vertical blanking interrupt (VBI) that is earlier in time than an actual VBI; performing, at the display controller, a scan-out with a display panel during the selective update state; and returning, at the display controller, to the dynamic sleep state in a same time frame after the scan-out is completed, wherein the display controller excludes timing logic to send a VBI at every time frame to the display panel to maintain time synchronization between the display controller and the display panel.

In one example of the at least one non-transitory machine readable storage medium, the timing logic to send the VBI at every time frame to the display panel that is excluded from the display controller is associated with a separate power domain with an always-on power rail that is accessible to the display controller.

In one example of the at least one non-transitory machine readable storage medium, the display controller and a central processing unit (CPU) coupled to the display controller enter a reduced power consumption package (PKG) CPU state (C-state) when the display controller is in the dynamic sleep state.

In one example of the at least one non-transitory machine readable storage medium, the reduced power consumption PKG C-state is achieved when all power rails are turned off except an always-on power rail that includes the timing logic to send the VBI at every time frame to the display panel, thereby enabling the display controller and the CPU to enter the reduced power consumption PKG C-state during the dynamic sleep state while the time synchronization between the display controller and the display panel is separately maintained using the always-on power rail.

In one example of the at least one non-transitory machine readable storage medium, the at least one non-transitory machine readable storage medium further comprises instructions when executed perform the following: starting performing the scan-out after the actual VBI when the display panel operates in a synchronous mode or at the actual VBI when the display panel operates in an asynchronous mode; and completing the scan-out after the actual VBI.

In one example of the at least one non-transitory machine readable storage medium, the programmed VBI that is earlier in time than the actual VBI is determined based on a calculated hardware latency and software latency.

In one example of the at least one non-transitory machine readable storage medium, the at least one non-transitory machine readable storage medium further comprises instructions when executed perform the following: starting performing the scan-out immediately after detection of the frame update and prior to the actual VBI; and completing the scan-out prior to the actual VBI.

In one example of the at least one non-transitory machine readable storage medium, the at least one non-transitory machine readable storage medium further comprises instructions when executed perform the following: performing the scan-out during the selective update state by: fetching a new frame; identifying changed scanlines of the new frame; and sending the changed scanlines of the new frame to the display panel.

While the forgoing examples are illustrative of the principles of technology embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A display panel comprising:

a remote frame buffer; and circuitry to:

receive a signal to accept a selective update region at a first time corresponding to a start of a frame, wherein the selective update region is associated with at least one set of coordinates;

receive the selective update region at the first time corresponding to the start of the frame;

copy the selective update region in the remote frame buffer for a panel self-refresh; and perform self-refresh based on the selective update region at a second time after the first time.

2. The display panel of claim 1, wherein the at least one set of coordinates indicates at least one region in the frame that has changed with respect to a previous frame.

3. The display panel of claim 1, wherein the display panel is in a smartphone, tablet, laptop, notebook, or vehicle.

4. The display panel of claim 1, wherein the selective update region is received from a display controller via a display panel interface.

5. The display panel of claim 4, wherein the display panel receives a signal every frame to maintain time synchronization with the display controller.

6. The display panel of claim 4, wherein the display panel interface comprises a DisplayPort (DP) interface.

7. The display panel of claim 4, wherein the display panel interface comprises an embedded DisplayPort (eDP) interface.

8. The display panel of claim 7, wherein the display panel uses a panel self-refresh 2 (PSR2) mechanism.

9. The display panel of claim 8, wherein the panel self-refresh 2 (PSR2) mechanism is enhanced to improve efficiency.

10. A method for a display panel comprising:

receiving a signal to accept a selective update region at a first time corresponding to a start of a frame, wherein the selective update region is associated with at least one set of coordinates;

receiving the selective update region at the first time corresponding to the start of the frame;

copying the selective update region in a remote frame buffer for a panel self-refresh; and performing self-refresh based on the selective update region at a second time after the first time.

11. The method of claim 10, further comprising indicating, by the at least one set of coordinates, at least one region in the frame that has changed with respect to a previous frame.

12. The method of claim 10, further comprising receiving the selective update region from a display controller via a display panel interface.

13. The method of claim 12, further comprising receiving a signal every frame to maintain time synchronization with the display controller.

14. The method of claim 12, wherein the receiving the selective update region comprises receiving the selective update region from the display controller via a DisplayPort (DP) interface.

15. The method of claim 12, wherein the receiving the selective update region comprises receiving the selective update region from the display controller via an embedded DisplayPort (eDP) interface.

16. The method of claim 15, further comprising using a panel self-refresh 2 (PSR2) mechanism.

17. The method of claim 16, wherein the using the panel self-refresh 2 (PSR2) mechanism is enhanced to improve efficiency.

* * * * *